(12) United States Patent
Tekippe (10) Patent No.: US 7,493,004 B2
(45) Date of Patent: Feb. 17, 2009

(54) ADHESIVE SYSTEM FOR OPTICAL DEVICES

(75) Inventor: Vincent J. Tekippe, The Villages, FL (US)

(73) Assignee: Neptec Optical Solutions, Inc., Fremont, CA (US)

( * ) Notice: Subject to any disclaimer, the term of this patent is extended or adjusted under 35 U.S.C. 154(b) by 0 days.

(21) Appl. No.: 11/565,525

(22) Filed: Nov. 30, 2006

(65) Prior Publication Data

US 2008/0019636 A1 Jan. 24, 2008

Related U.S. Application Data (63) Continuation of application No. 10/672,595, filed on Sep. 26, 2003, now abandoned, which is a continuation-in-part of application No. 10/217,178, filed on Aug. 12, 2002, now Pat. No. 6,735,006.

(51) Int. Cl.
*G02B 6/00* (2006.01)
*G02B 6/26* (2006.01)

(52) U.S. Cl. ........................ 385/137; 385/18

(58) Field of Classification Search ............ 385/26, 385/31, 50–52, 55, 60, 66, 68, 72, 78, 80, 385/84, 82, 137, 18
See application file for complete search history.

(56) References Cited

U.S. PATENT DOCUMENTS

| | | | |
|---|---|---|---|
| 5,109,460 A | 4/1992 | Baek et al. |
| 5,133,030 A | 7/1992 | Lee |
| 5,175,780 A | 12/1992 | Sano et al. |
| 5,542,013 A | 7/1996 | Kaplow et al. |
| 5,546,180 A | 8/1996 | Garel-Jones et al. |
| 6,094,293 A | 7/2000 | Yokoyama et al. |
| 6,282,349 B1 | 8/2001 | Griffin |
| 6,344,635 B2 | 2/2002 | Brennan |
| 6,404,942 B1 | 6/2002 | Edwards et al. |
| 6,751,374 B2 | 6/2004 | Wu et al. |
| 6,757,471 B2 | 6/2004 | Jeong et al. |
| 2003/0081926 A1 | 5/2003 | Jeong et al. |
| 2004/0022497 A1 | 2/2004 | Lindsey |

*Primary Examiner*—Charlie Peng
(74) *Attorney, Agent, or Firm*—Pitts & Brittian, P.C.

(57) ABSTRACT

An adhesive system for securing optical elements to a housing or substrate in an aligned position that is maintained over widely varying environmental conditions. A fiber optic device is constructed such that applied adhesive is not disposed between a fiber optic element and the housing of the fiber optic device, but is disposed on longitudinal seams defined by the portion of the element proximal a side of the housing or substrate. In one embodiment, the adhesive has a filler, such as amorphous silica. A method of making includes aligning, applying adhesive, and curing adhesive.

23 Claims, 7 Drawing Sheets

ADHESIVE SYSTEM FOR OPTICAL DEVICES

CROSS-REFERENCE TO RELATED APPLICATIONS

This application is a continuation of prior application Ser. No. 10/672,595, filed Sep. 26, 2003, which was a continuation-in-part of prior application Ser. No. 10/217,178, filed Aug. 12, 2002, now U.S. Pat. No. 6,735,006.

STATEMENT REGARDING FEDERALLY SPONSORED RESEARCH OR DEVELOPMENT

Not Applicable

BACKGROUND OF THE INVENTION

1. Field of Invention

This invention pertains to an adhesive system for optical devices. More particularly, this invention pertains to fiber optical devices, such as those used for switching fiber optic cables, and securing optical components or elements in a housing such that misalignment of the components due to environmental changes is minimized.

2. Description of the Related Art

Fiber optic systems typically require fiber optic elements, such as switches and couplers, to perform the desired operations of the system. Because of this, it is common for a fiber optic system to include at least one fiber optic element. However, associated with the inclusion of fiber optic elements is the undesired characteristic of insertion loss. Insertion loss is the loss of signal power due to the insertion of a device into a transmission line. More particularly, an optical signal has greater signal power when it enters a fiber optic element than it does when it leaves the fiber optic element. Although, insertion loss is unavoidable when incorporating fiber optic elements into a fiber optic system, the displacement or misalignment of fiber optic elements, such as collimators and actuators, within the fiber optic element induces unnecessary insertion loss. The displacement or misalignment of fiber optic elements causes an optical signal to travel a path slightly altered from the designed signal path. The altered path prevents a receiving collimator from receiving a robust signal, and in extreme conditions, the receiving collimator receives no signal.

Fiber optic elements are typically secured within the housing of a fiber optic element by way of epoxy resin. Epoxy resin, commonly referred to as epoxy, is a flexible, usually thermosetting resin made by the copolymerization of an epoxide with another compound having two hydroxyl groups and is typically used for adhesives. Conventionally, a fiber optic element is secured within the housing of a fiber optic element by first inserting the element into a corresponding port that is defined by the housing. The port is sized slightly larger than the element and shares the same general shape of the element. After being inserted into the port, the element is aligned for designed operation. Epoxy is then applied around the outer surfaces of the element and the inner surfaces of the port such that a layer of epoxy is disposed between the element and the housing, thus securing the element within the housing. The epoxy is then cured by exposing the epoxy to the light from an ultraviolet wand. During the process of curing, the epoxy expands and contracts and displaces the corresponding fiber optic element from its designed position. The displaced element causes a corresponding optical signal to travel the previously discussed altered path. Additionally, epoxy expands and contracts in response to thermal variations. Therefore, exposure to thermal variation further displaces the fiber optic element.

Another limitation of conventional fiber optic elements is the difficulty they present regarding the application of epoxy. Once a fiber optic element is inserted into its corresponding port, the remaining space in which the epoxy is applied is very limited and difficult to access. This causes the application of the epoxy to be cumbersome and sometimes insufficient. Similarly, curing the epoxy that has been applied within the confined space offered by conventional elements is cumbersome and sometimes insufficient. Additionally, because conventional methods and devices confine the epoxy between an element and the housing of a fiber optic element, as the epoxy expands under thermal stimulation, it has potential to break the housing, the element, or both.

For example, U.S. Pat. No. 5,133,030, titled "Fiber Optic Switch," issued to Lee on Jul. 21, 1992, discloses the conventional method of adhering optical elements. Lee discloses using an adhesive to secure optical fibers F1, F2 within a ferrule M by filling the gap between the fibers F1, F2 and the ferrule M with adhesive.

BRIEF SUMMARY OF THE INVENTION

An adhesive system for optical elements is provided. The adhesive system secures optical elements to a housing or substrate in an aligned position and is not intended to be within the optical path. The adhesive system includes an optical element, typically cylindrically shaped, but it may have planar surfaces, and a housing or substrate to which the optical element is to be secured or fixed. The housing has an opening for receiving the optical element and longitudinal slots positioned on opposing sides of the optical element opening and having the longitudinal axis parallel to the longitudinal axis of the optical element. The optical element is aligned relative to the housing and an adhesive joins the slot walls to the optical element.

For the embodiment where the optical element is secured to a substrate, the substrate has two substantially parallel surfaces substantially perpendicular to the surface of the optical element and oriented parallel to the longitudinal axis of the optical element. The optical element is aligned relative to the substrate and an adhesive joins the substrate surfaces to the optical element.

In another embodiment, for cylindrical optical elements, a pair of slots or openings in the housing or substrate are substantially diametrically opposed relative to the optical element. In this manner, the adhesive along opposite sides of the optical element maintain the alignment of the element as the temperature and other environmental conditions vary.

In one embodiment, the adhesive is an epoxy with amorphous silica filler. The uncured adhesive has high viscosity and does not easily wick or flow into crevices or cracks. In one embodiment, the viscosity of the adhesive is at least 5000 centipoise. In one embodiment the amorphous silica is substantially spherical particles, in another embodiment the amorphous silica is substantially angular, or irregularly shaped, particles, and in still another embodiment, the amorphous silica is a combination of spherical and angular particles. In one embodiment, the filler has a concentration equal to or greater than 68%. As the epoxy shrinks during curing, the amorphous silica particles come into direct contact with other amorphous silica particles forming a compacted rigid structure, and the particles are placed under compression by the shrinking epoxy.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An adhesive system for fixing an optical element within an optical device is disclosed. An adhesive is applied to an optical device and a slotted housing in such a manner as to minimize displacement of the optical element during curing and as the ambient temperature varies. A 1×2 or 2×1 optical switch 110 is used as one example of the adhesive system.

Figure 1:
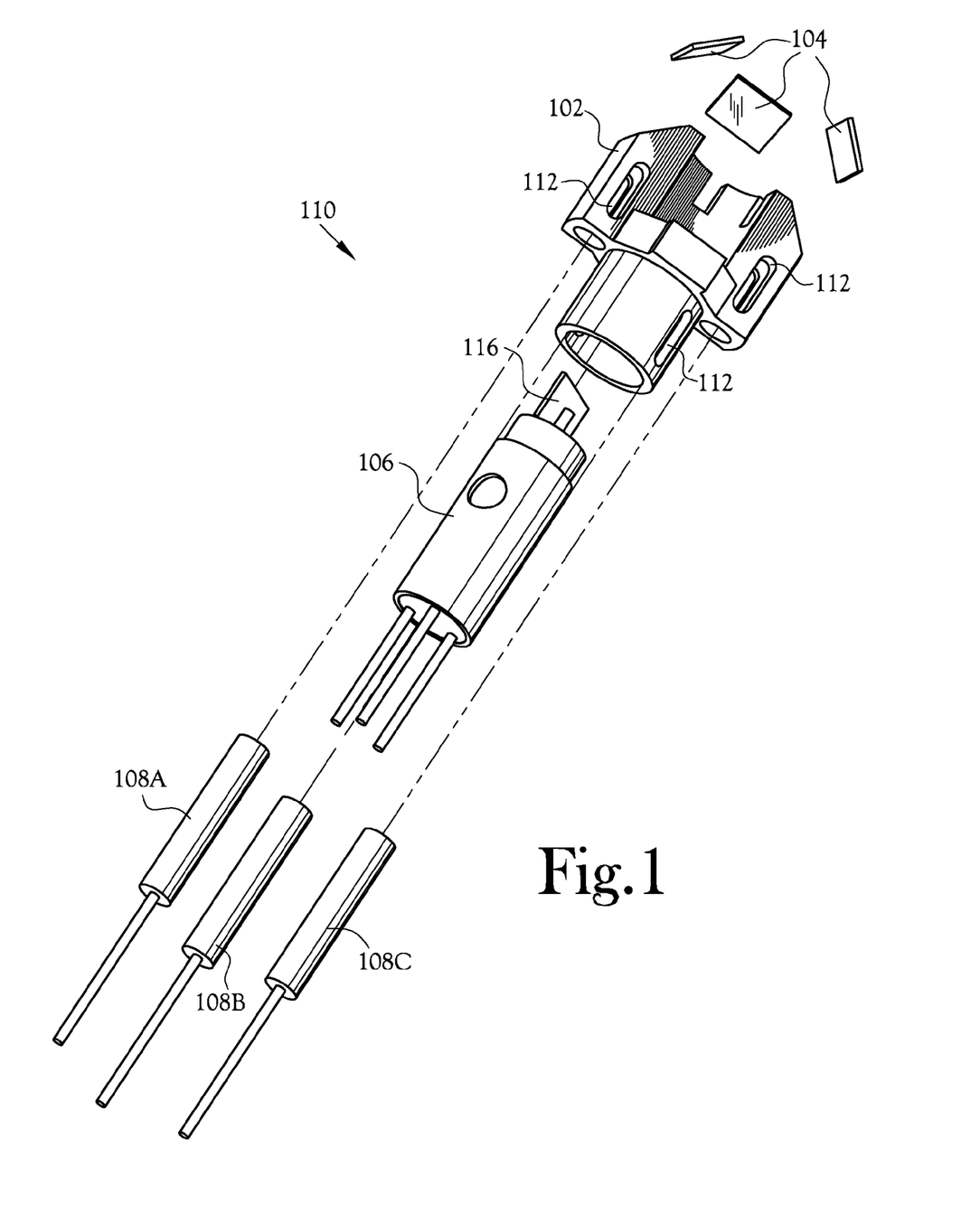
FIG. 1 illustrates an exploded perspective view of one embodiment of a fiber optic device.

FIG. 1 illustrates an exploded view of a 1×2 or 2×1 optical switch 110. The switch 110 includes a housing, or body, 102, three mirrors 104, an actuator 106, and three collimators 108. In one embodiment the actuator 106 is a bistable device that interjects a mirror into the optical pathway that travels from one collimator 108A, is reflected by two mirrors 104, and travels into a second collimator 108C.

Visible in FIG. 1 are the slots 112 through which an adhesive is applied. The slots 112 are longitudinally oriented with respect to the optical elements, for example the actuator 106 and the collimators 108. In one embodiment, the slots 112 have rounded ends with long sides. In another embodiment, the slots 112 are rectangular.

Figure 2:
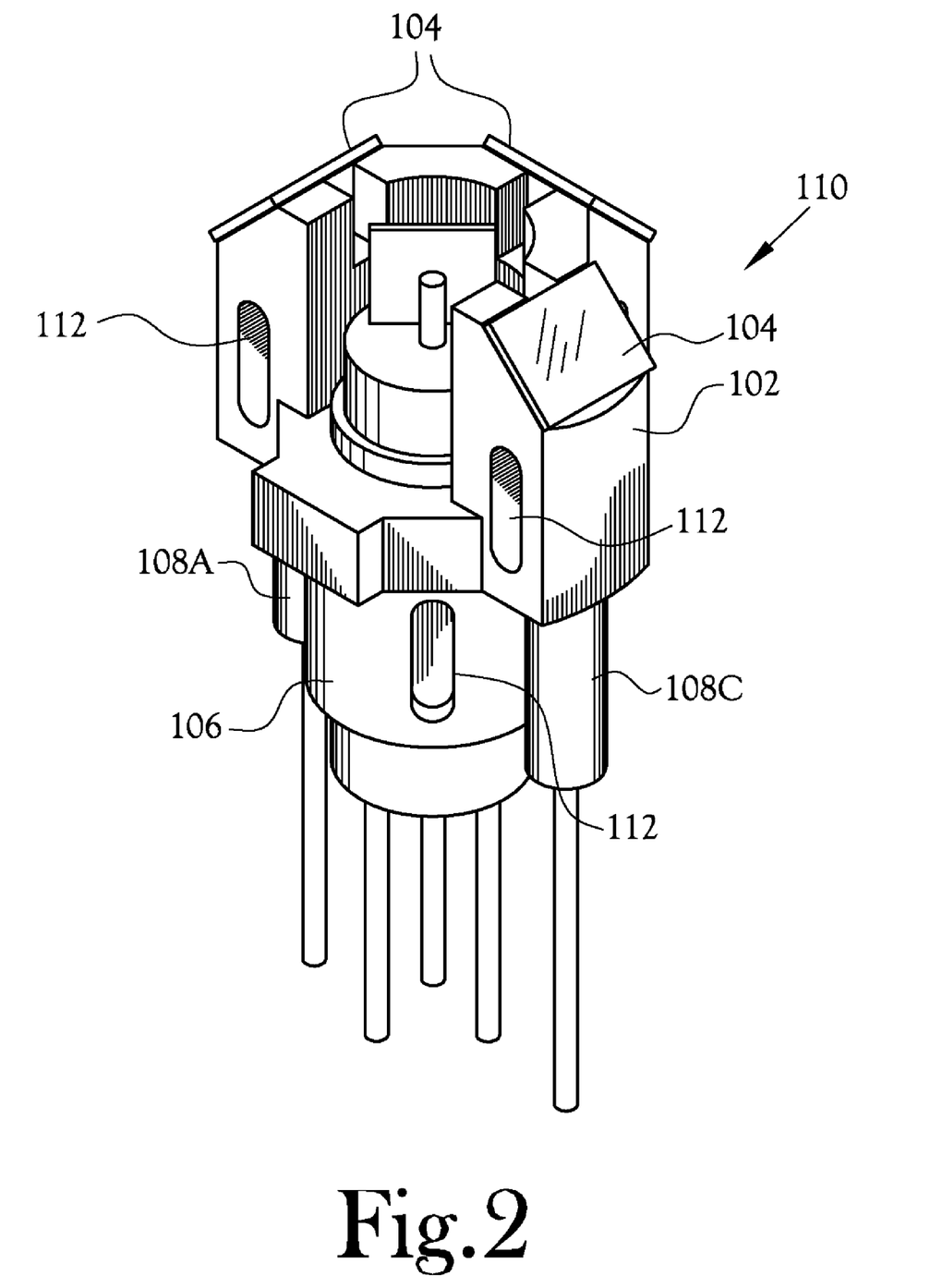
FIG. 2 is a perspective view of the fiber optic device illustrated in FIG. 1.

FIG. 2 illustrates the optical switch 110 as an assembled unit. The 1×2 switch 110 receives an optical signal through one collimator 108A and the optical signal is output through another collimator 108C by reflecting the optical signal with two of the mirrors 104. With the actuator 106 in an extended position with a mirror introduced into the optical path, the optical signal is redirected from one collimator 108A to another collimator 108B by a mirror attached to the actuator 106. In another embodiment, the switch 110 is a 2×1 switch in which an optical signal through a first collimator 108A passes through a second collimator 108C unless the actuator 106 extends a mirror and routes a second optical signal from a third collimator 108B to the second collimator 108C.

In another embodiment of the optical device, the device has two collimators 108 and two mirrors 104 for directing an optical signal from one collimator 108A to the second collimator 108C. The actuator 106 includes an attenuator, which the actuator 106 controls. In one embodiment, the attenuator is interjected into the optical path of the optical signal. In another embodiment, the attenuator is a variable attenuator in which the level of attenuation is selectively controlled by the actuator 106.

With optical devices, the precision with which the optical path is directed affects the performance of the device. It is desirable to minimize any displacement of any of the optical elements relative to other elements. Further, it is desirable that the alignment of the optical elements remain stable over widely varying environmental conditions, including temperature and humidity. In prior art devices, displacement occurs when the environmental conditions, including ambient temperature, varies over a relatively small range.

Figure 3:
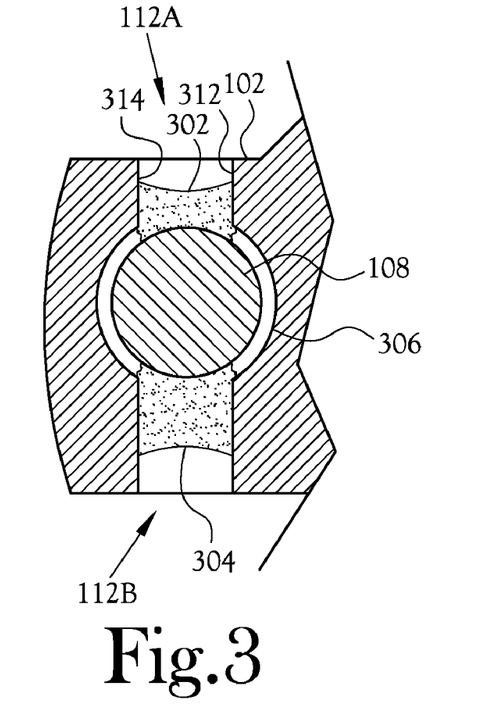
FIG. 3 is a cross-sectional view of a fiber optic element and slotted housing.

FIG. 3 illustrates a cross-section of a portion of the housing 102 and a collimator 108. Those skilled in the art will recognize that the collimator 108 and the actuator 106 are considered optical elements, and that the set of optical elements includes other elements than just the collimator 108 and the actuator 106. For illustration purposes, with respect to the adhesive system the terms are used interchangeably when referring to an element being adhered to a housing 102 or substrate. Further, in describing the adhesive system, the optical elements and housing may be variously described, interchangeably, as members. In other words, in one embodiment the optical element 108 is a first member and the housing 102 is a second member. In another embodiment, the housing 102 is a first member and the optical element 108 is a second member. In both embodiments the first member includes an opening for receiving the second member, and the first member has slots into which adhesive is introduced. In still another embodiment, the housing 102 is formed in two pieces, or substrates, adapted to mate with the optical element 108. The substrates have a gap or space between them into which an adhesive 302, 304 is placed. (See FIG. 6 for an example of this embodiment.) Also, the housing 102 and substrates 602, 604 are support members.

The optical element 108 loosely fits into an opening in the housing 102, as shown by the gap 306 between the housing 102 and the optical element 108. Two slots 112A, 112B are located in the housing 102 on diametrically opposed sides of the optical element 108. An adhesive 302, 304 connects the housing 102 to the optical element 108 by bridging the distance between two walls 312, 314 of the slot 112 and attaching to the optical element 108.

The adhesive has a high viscosity, which prevents the adhesive from flowing into the gap 306 between the housing 102 and the optical element 108. A viscosity equal to or greater than 5000 centipoise, when used with the gaps 306 typically found in optical elements 108, is sufficient to prevent the adhesive flowing, or wicking, into the gap 306. In one embodiment, the adhesive has a viscosity of 12,000 to 15,000 centipoise. The gap 306 is sized to allow the optical element, which in the illustrated embodiment is a optical element 108, to be moved within the housing 102 to align the optical element to minimize insertion loss. Once the optical element 108 is aligned, the adhesive 302, 304 is applied and cured. Because of the low shrinkage and thermal stability of the adhesive 302, 304, in combination with the arrangement of the slots 112 with respect to the optical element 108, the elements 108 alignment is maintained after curing and during operation.

In one embodiment, a UV curable adhesive is selected. In another embodiment, the transition point of the adhesive 302, 304 is outside the operating temperature range, which enhances the dimensional stability of the optical device 110. In still another embodiment, keeping the transition point outside the operating range is accomplished by using fillers. In an embodiment of the adhesive with a filler, when the epoxy is cured, the filler is placed in compression. The filler, in one embodiment is amorphous silica, which can be spherical or angular or a combination of the two. The filler is blended with the adhesive to form an admixture having a concentration of between 60 to 84% filler, with concentrations between 68 and 80% filler showing very good results. Epoxy normally experiences approximately 20% shrinkage when cured. When the epoxy with filler is cured, the filler granules come into direct contact with each other, resulting in compressive forces being applied to the filler as the epoxy shrinks. The amorphous silica experiences very little shrinkage or expansion under ambient temperature ranges and is a window to ultraviolet light, so that it does not interfere with the curing process for the adhesive. Amorphous silica is also relatively inert chemically and thermally, and it can withstand significant compression stress and is available at reasonable cost. Those skilled in the art will recognize that other materials with properties similar to amorphous silica can be used without departing from the spirit and scope of the present invention.

In one embodiment, the amorphous silica has a crystalline content of less than 0.5%. At 99.5% purity of amorphous silica the morphology is stable. As impurities increase in the amorphous silica, the temperature related properties suffer because of the manufacturing techniques that result in increased crystalline content with increased impurities. A typical lower limit of purity would be approximately 98%; however, purity of approximately 96% may be acceptable based on the chemical content of the impurities.

In another embodiment, the amorphous silica has an average particle size less than 10 micrometers. Epoxy with amorphous silica filler of at least 68% concentration of filler experiences less than 0.1%, oftentimes between 0.04 to 0.05% during testing, linear shrinkage during curing. Further, thermal expansion/contraction is limited to less than 100 ppm per degree Celsius, typically 6 to 60 ppm, over a temperature range of −40 to +85 degrees Centigrade.

The configuration illustrated in FIG. 3 has certain features that result in a stable configuration. In particular, after the optical element 108 is positioned and aligned, the adhesive 302, 304 is applied and cured with very little shifting of the optical element 108 relative to the housing 102 occurring as a result of the curing. The adhesive 302, 304 adheres to the sidewalls 312, 314 of the longitudinal slot 112 and to the optical element 108. The surface of the adhesive 302, 304 opposite the optical element 108 is exposed to the environment and is free to contract from shrinkage during curing and to expand due to thermal expansion.

The adhesive 302, 304, as it cures, shrinks, which causes tension forces to be applied to the slot 112 side walls 312, 314. Further, because of the opposing slots 112A, 112B, as the adhesive shrinks during curing, the optical element experiences tension between the two applications of adhesive 302, 304. These tension forces are small because, during curing, the adhesive 302, 304 shrinks only a small amount. In testing, good performance of the adhesive connection was found when the slot 112 had a longitudinal axis aligned with the longitudinal axis of the optical element 108, and the slot's longitudinal axis was substantially longer than the width of the slot 112. The joint, or seam, formed by the adhesive 302, 304 bridging the gap 306 adjacent the slot side walls 312, 314 and the surface of the optical element 108 is longer when the slot 112 has a long longitudinal axis. The joint extending along the longitudinal axis of the optical element 108 aids in maintaining the alignment of the optical element 108 relative to the housing 102.

In another embodiment, the adhesive system includes an optical element 108, a housing 102 or substrate with a single slot 112, and adhesive 302 in that slot 112A bridging the area between the slot walls 312, 314 and the optical element 108. In this embodiment, the optical element 108 is either cylindrical or planar, for example, a mirror, and there is no gap 306 between the optical element 108 and the housing 102 or substrate. The adhesive 302 in the slot 112A fixes the optical element 108 to the housing 102 or substrate such that the optical element is not displaced relative to the housing 102 or substrate during curing or temperature variations. The mechanism that obtains this stability in this embodiment differs from the mechanism for the illustrated embodiment. In this embodiment, the shrinkage of the adhesive 302 applies tension between the walls 312, 314 of the slot 112A and between the adhesive 302 and the optical element 108. The tension between the adhesive 302 and the optical element 108 creates a compressive force between the optical element 108 and the housing 102 or substrate at the area where they are in contact. As long as the compressive force remains as the adhesive experiences temperature variations, the optical element 108 will maintain dimensional stability relative to the housing 102 or substrate.

In one embodiment, the adhesive 302, 304, in combination with the slots 112A, 112B function to adhere the optical element 108 to the support member 102. In another embodiment, the adhesive 302, 304 with an amorphous silica filler, in combination with the slots 112A, 112B function to adhere the optical element 108 to the support member 102. In still another embodiment, the adhesive 302, in combination with the slot 112A function to adhere the optical element 108 to the support member 102 when the optical element 108 and the support member 102 are in contact. In yet another embodiment, the adhesive 302 with an amorphous silica filler, in combination with the slot 112A function to adhere the optical element 108 to the support member 102 when the optical element 108 and the support member 102 are in contact.

Figure 4:
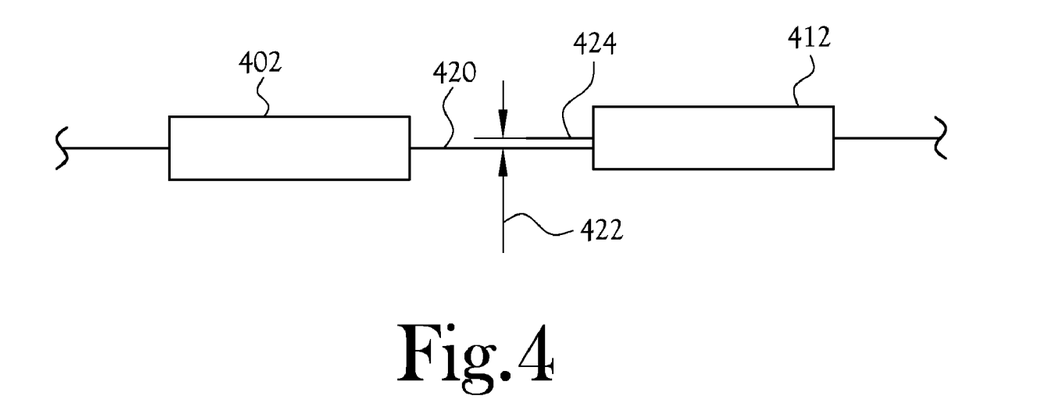
FIG. 4 is an illustration of lateral offset between two optical elements.

FIG. 4 illustrates how an optical signal 420 can be misaligned between two collimators 402, 412. The optical signal 420 originates from a first collimator 402, which receives the signal 420 from a source. In an optimal configuration, the centerline of the optical signal 420 is aligned with the centerline 424 of a second collimator 412. In the illustrated example, the optical signal 420 has a lateral offset 422 relative to the second collimator 412, resulting in an insertion loss, which is typically expressed in decibels (dB).

Figure 5:
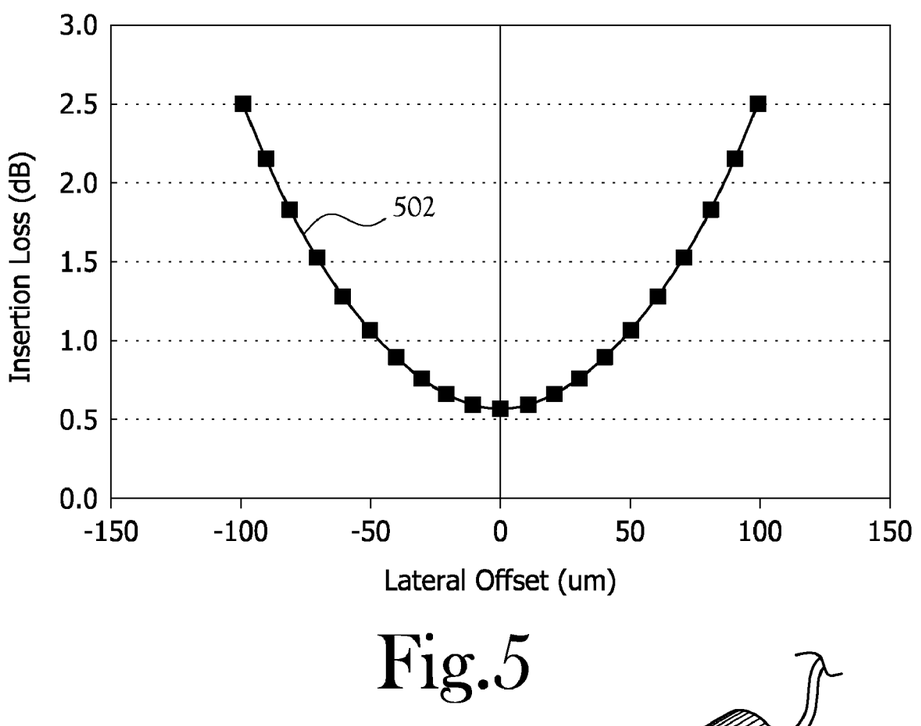
FIG. 5 is a chart illustrating the relationship of lateral offset to insertion loss.

FIG. 5 illustrates a chart that plots lateral offset 422 against insertion loss. The offset curve 502 shows a minimum insertion loss when there is no lateral offset 422. As the lateral offset 422 increases, with the increases shown as micrometers (μm), the insertion loss increases.

Figure 6:
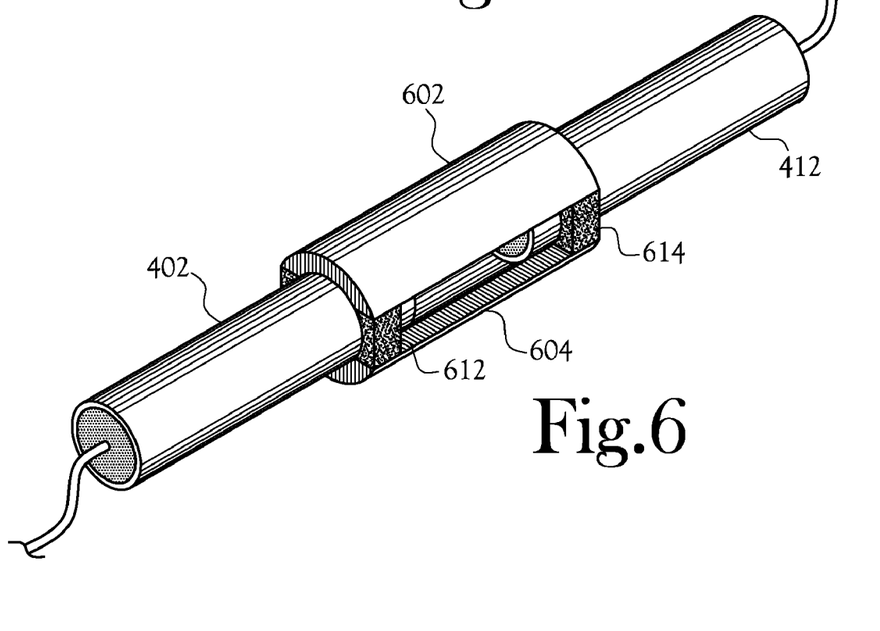
FIG. 6 is a perspective view of a test device made of in-line collimators assembled in accordance with the present invention.

FIG. 6 illustrates a test device 610 that includes a pair of collimators 402, 412 aligned and secured with adhesive 612, 614. A first substrate 602 is placed in direct contact with the first collimator 402 and the second collimator 412. A second substrate 604 is positioned opposite the first substrate 602 and in direct contact with the first collimator 402 and the second collimator 412. With the collimators aligned 402, 412 such that the optical signal 422 has no lateral offset 422, adhesive 612, 614 is applied between the two substrates 602, 604 at the seams defined by the direct contact of the substrates 602, 604 and the collimators 402, 412. Although only one side of the test device 610 is shown, adhesive is applied between the substrates 602, 604 on the non-visible side, also. The adhesive 612, 614 is cured with an ultraviolet wand.

Figure 7:
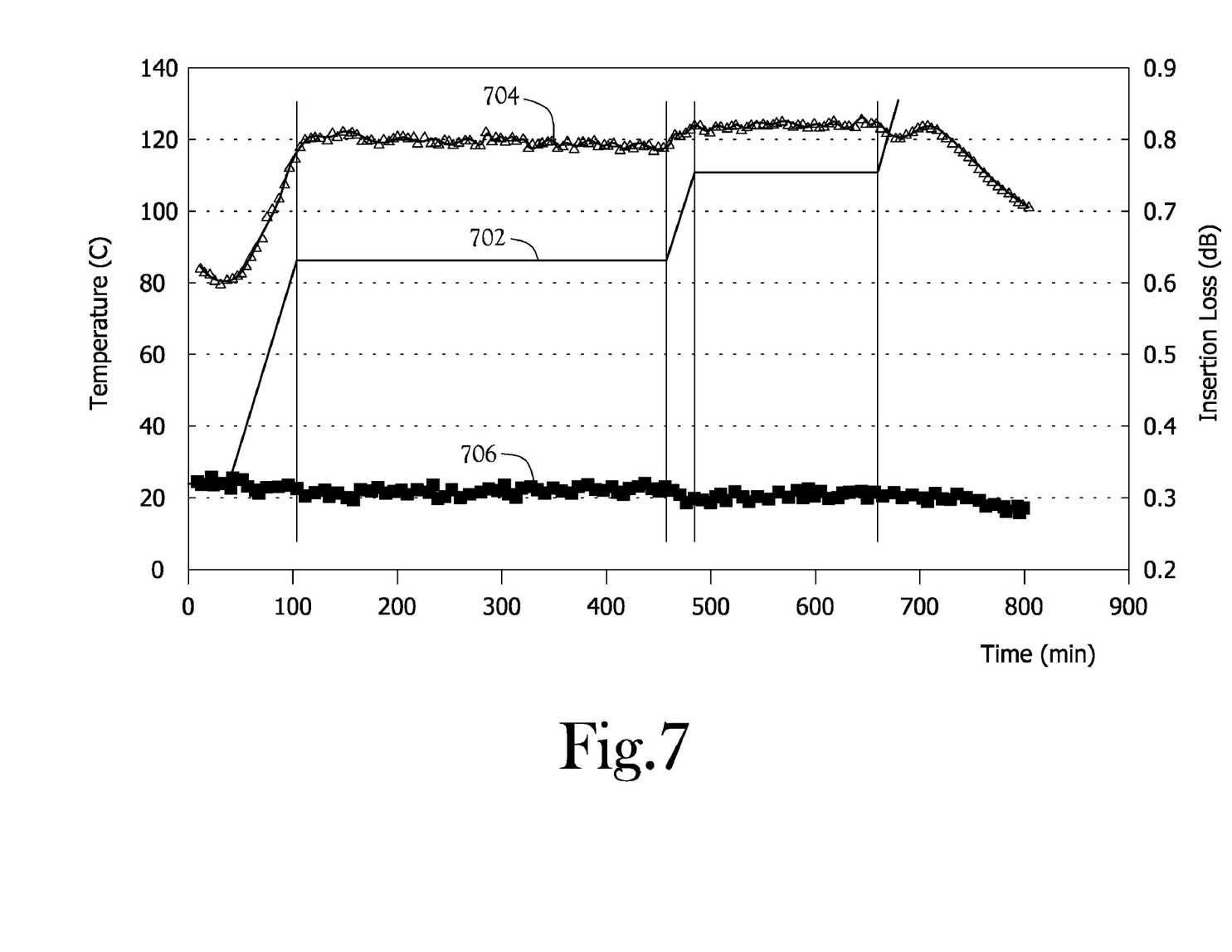
FIG. 7 is a chart illustrating the results of a temperature soak test.

FIG. 7 charts the results of a soak test that involved heating the test device 610 to a temperature 702 for a specified time and showing the insertion loss over time as the temperature varies. Additionally, in order to fully illustrate the performance, a conventional-type device was subjected to the same test. The conventional-type device was constructed of two collimators 402, 412 inserted in opposite ends of a cylindrical tube with the adhesive applied between the aligned collimators 402, 412 and the cylindrical tube.

In FIG. 7, a temperature curve 702 is shown in terms of Celsius degrees with respect to time. A test device curve 706 represents the performance of the test device 610 and is shown in terms of insertion loss with respect to the temperature curve 706 and time. A conventional device curve 704 represents the performance of the conventional-type device and is shown in terms of insertion loss with respect to the temperature curve 706 and time. In the chart of FIG. 7, insertion loss is evaluated in terms of decibels (dB) and time is evaluated in terms of minutes (min).

The test device curve 706 reveals less initial insertion loss than the conventional device curve 704 as indicated by the insertion loss values at zero minutes and ambient temperature. However, as the temperature was increased to 85 degrees Celsius, the test device curve 706 maintained a substantially consistent insertion loss value while the conventional device curve 704 indicated an increase in insertion loss. The temperature was raised to 120 degrees Celsius and the test device curve 706 maintained a substantially consistent insertion loss value while the conventional device curve 704 indicated a further increase in insertion loss. Finally, the temperature was raised to 130 degrees Celsius where the oven shutdown. As the temperature dropped after the shutdown, the conventional device curve 704 indicated a drop in insertion loss. However, the test device curve 706 maintained a substantially consistent insertion loss value relative to the conventional device curve 704.

The results of the soak test reveal that fiber optic devices constructed in accordance with the test device 610 introduce less insertion loss to a fiber optic system than fiber optic devices assembled in a conventional manner. This is seen by the initial insertion loss values, which indicate the test device 610 better limits the negative effects of epoxy during a cure than do conventional devices. It is also seen that the variation in insertion loss with respect to temperature variations is negligible for the test device 610. On the other hand, insertion loss introduced by conventional devices changes with temperature variations.

Figure 8:
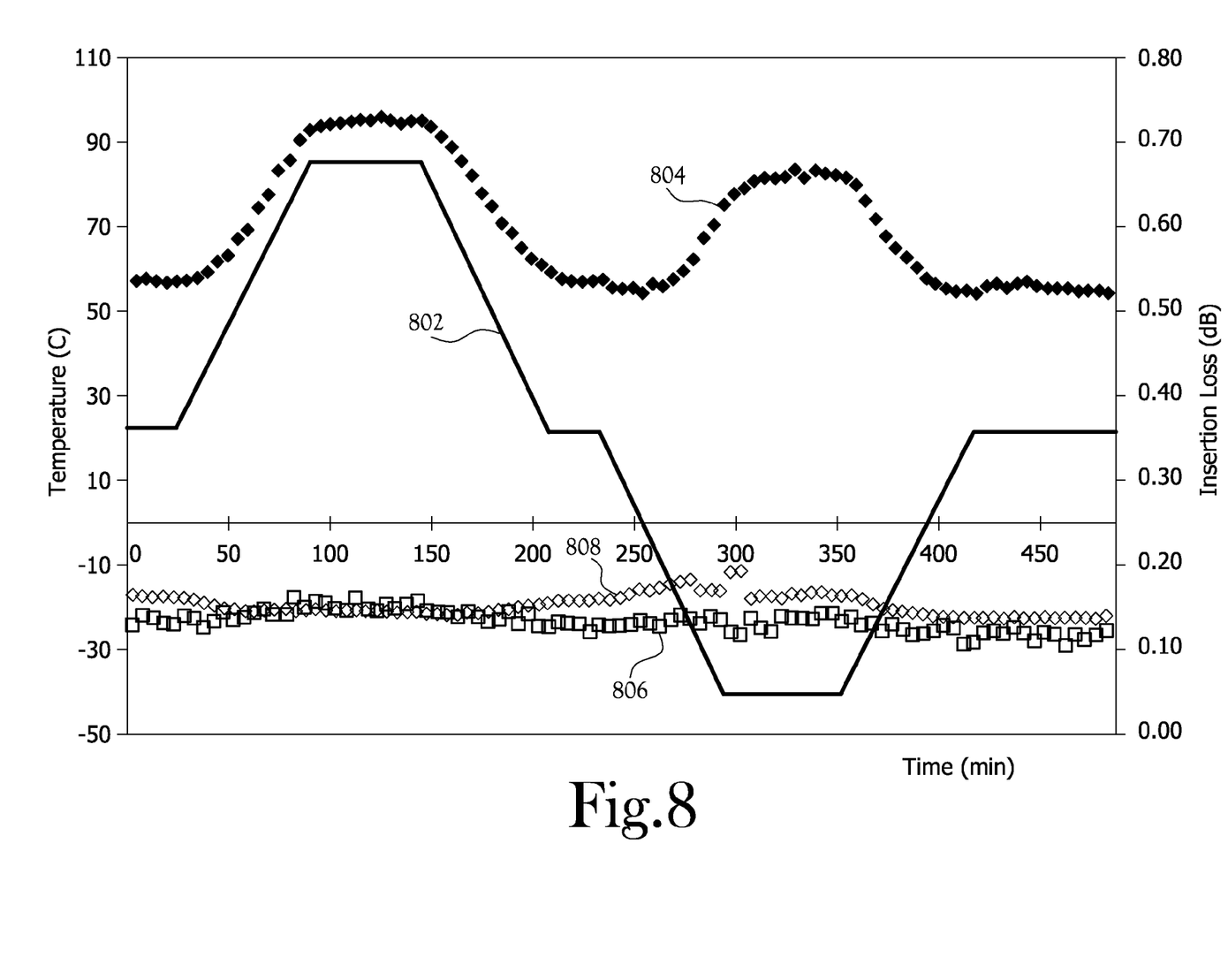
FIG. 8 is a chart illustrating the results of a temperature cycle test.

FIG. 8 illustrates the results of a temperature cycle test. This test included heating the test device 610 to 85 degrees Celsius and then cooling it to −40 degrees Celsius. The temperature cycle test also included subjecting a conventional-type device as described above to the test.

In FIG. 8, a temperature curve 802 is shown in terms of Celsius degrees with respect to time. A first test device curve 806 represents the performance of the first test device 610 and is shown in terms of insertion loss with respect to the temperature curve 802 and time. A second test device curve 808 represents the performance of a second test device 610 and is shown in terms of insertion loss with respect to the temperature curve 802 and time. A conventional device curve 804 represents the performance of the conventional-type device and is evaluated in terms of insertion loss with respect to the temperature curve 802 and time. In the chart of FIG. 8, insertion loss is evaluated in terms of decibels (dB) and time is evaluated in terms of minutes (min).

Similar to the soak test, the first test device curve 806 and the second test device curve 808 reveal less insertion loss due than the conventional device curve 804 as indicated by the insertion loss values at zero minutes. However, significantly, as the temperature varies over time, the conventional device curve 804 shows an insertion loss that varies with the change in temperature 802, whereas the first test device curve 806 and the second test device curve 808 show no such correlation by maintaining a substantially consistent value of insertion loss.

The results of the temperature cycle test reveal that devices constructed in accordance with the test device 610 are more effective at limiting device-induced insertion loss introduced to a fiber optic system than are conventional devices. For example, the insensitivity of the insertion loss during thermal cure of the adhesive during the first part of the thermal soak test illustrates that that fiber optic devices constructed in accordance with the teachings herein better limit the negative effects of adhesive shrinkage than do conventional techniques. Additionally, the results of the temperature cycle test clearly indicate that the magnitude of insertion loss induced by conventional devices varies with changing temperatures. The results of the temperature cycle test also clearly indicate that the amount of insertion loss induced by a device constructed in accordance with the test device 610 remains substantially consistent regardless of temperature or changes thereof.

Figure 9:
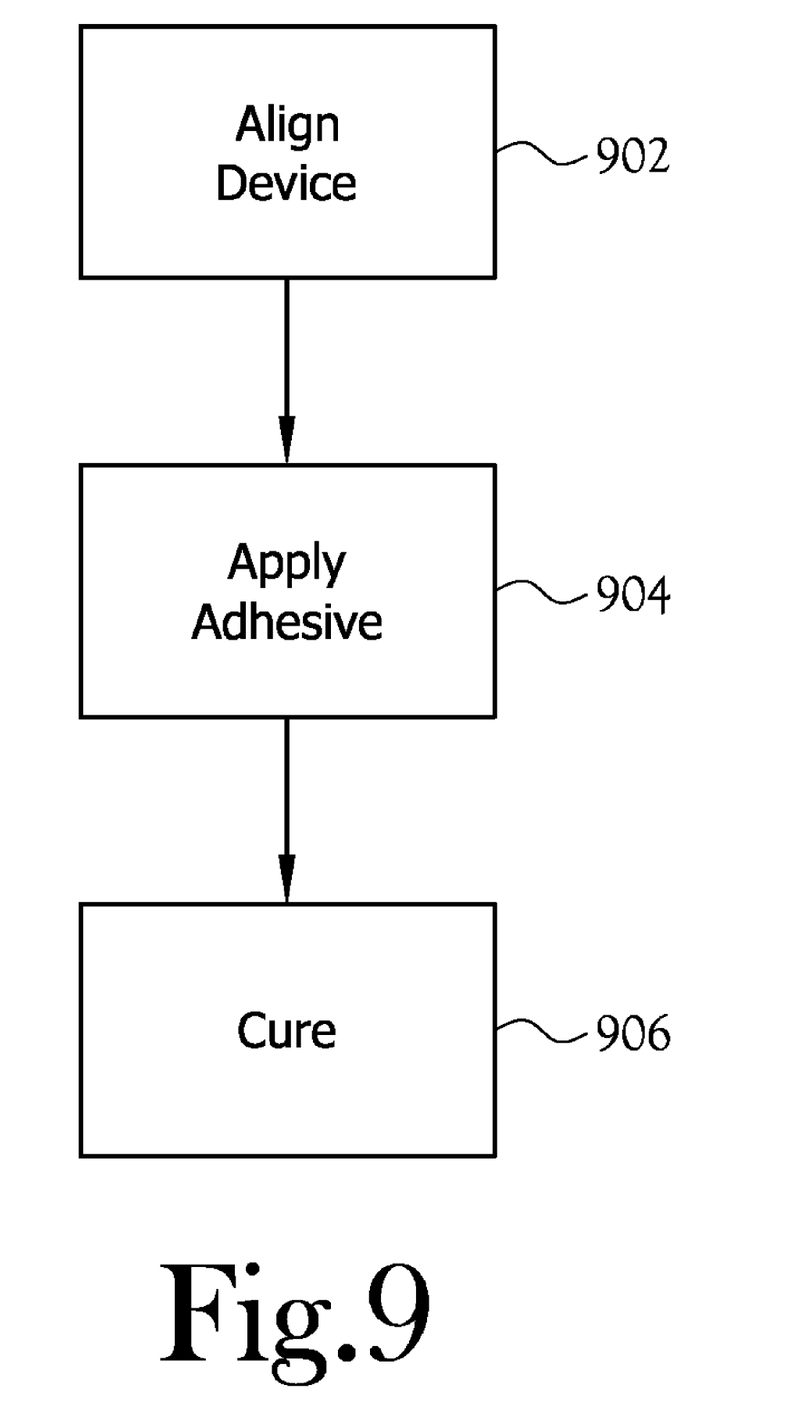
FIG. 9 is a flow chart of one embodiment for the method of adhering.

FIG. 9 illustrates the steps for one embodiment of the method of adhering optical elements in accordance with the present invention. The first step is aligning 902 the optical element 106, 108 relative to the housing 102 or substrate 602, 604 for minimum insertion loss. The second step is to apply the adhesive 904. In one embodiment, the adhesive is applied to longitudinal slots on opposing sides of the optical element. The slots are formed in a housing 102, or, in another embodiment, the slots are formed in one or more substrates 602, 604. The third step is curing 906 the adhesive 302, 304.

In one embodiment, the aligning step 902 is performed with a high-precision robot that actively aligns the optical element 106, 108 by using the intensity of an optical signal as feedback and moving the optical element 106, 108 to maximize the optical signal strength or intensity. The robot maintains the alignment of the optical element 106, 108 relative to the support member during the application of adhesive step 904 and the curing step 906.

The disclosed adhesive system includes various functions. The function of supporting the optical element 108 is performed by the support member 102. In various embodiments, the support member 102 is the housing 102 or a pair of substrates 602, 604. The function of adhering said optical element to the means for supporting is performed, in one embodiment, by the adhesive 302 in a slot 112 in the support member 102, with the adhesive contacting the optical element 108. In another embodiment, the function of adhering is performed by the adhesive 302, 304 in opposing slots 112A, 112B in the support member 102, with the optical element 108 interposed between the slots 112A, 112B.

From the foregoing description, it will be recognized by those skilled in the art that an adhesive system for securing optical elements has been provided. The adhesive is not intended to be placed in the optical path. Instead, the adhesive system secures optical elements to a housing or substrate in an aligned position that is maintained over widely varying environmental conditions. The adhesive system includes an optical element, typically cylindrically shaped, but it may have planar surfaces, a housing or substrate to which the optical element is to be secured or fixed, and an adhesive. The adhesive includes a filler of amorphous silica and shrinks very little when cured and is dimensionally stable over a wide temperature range.

While the present invention has been illustrated by description of several embodiments and while the illustrative embodiments have been described in considerable detail, it is not the intention of the applicant to restrict or in any way limit

Having thus described the aforementioned invention, what is claimed is:

1. An optical device comprising:
    a first optical element;
    a support member defining an aperture for receiving said first optical element, said support member having a pair of openings diametrically opposed relative to said first optical element in said opening, each of said pair of openings having a passage from an outside surface of said support member to said aperture; and
    an adhesive disposed within said pair of openings, said adhesive adhering to said first optical element and to an inside surface of said pair of openings, said adhesive having a viscosity sufficiently high that said adhesive, in an uncured state, does not substantially wick between said first optical element and said support member.

2. The optical device of claim 1 wherein said adhesive is limited to a volume bounded by said pair of openings and a surface of said first optical element.

3. The optical device of claim 1 wherein said adhesive is an epoxy with a filler.

4. The optical device of claim 1 wherein said adhesive is an epoxy with a filler having a concentration of at least 68%, said filler being amorphous silica.

5. The optical device of claim 1 wherein said adhesive includes a filler of amorphous silica having an average particle size less than or equal to 10 micrometers.

6. The optical device of claim 1 wherein said adhesive has no more than 0.1% shrinkage during curing.

7. The optical device of claim 1 wherein said adhesive has no more than 100 ppm per degree Celsius of thermal expansion over a temperature range from −40 degrees Celsius to +85 degrees Celsius.

8. The optical device of claim 1 wherein said first optical element is selected from a group including a collimator, an actuator, an attenuator, and an optical filter.

9. The optical device of claim 1 wherein each of said pair of openings has a longitudinal axis parallel to a longitudinal axis of said first optical element.

10. The optical device of claim 1 further including:
    a second optical element;
    a second aperture defined by said support member, said support member having a second pair of openings diametrically opposed relative to said second optical element in said second aperture, said second pair of openings having a passage from an outside surface of said support member to said second aperture, each of said second pair of openings having a longitudinal axis parallel to a longitudinal axis of said second optical element; and
    said adhesive disposed within said second pair of openings, said adhesive adhering to said second optical element and to an inside surface of said second pair of openings, said adhesive having a viscosity sufficiently high that said adhesive, in an uncured state, does not substantially wick between said second optical element and said support member.

11. An optical device comprising:
    a first optical member;
    a support member defining an opening for receiving said first member, said second member having a pair of slots diametrically opposed relative to said first member in said opening, each of said pair of slots having a passage from an outside surface of said second member to said opening, each of said pair of slots having a longitudinal axis parallel to a longitudinal axis of said first member; and
    an adhesive disposed within said pair of slots, said adhesive adhering to said first member and to an inside surface of said pair of slots, said adhesive having a viscosity sufficiently high that said adhesive, in an uncured state, does not substantially wick between said first member and said second member, said adhesive including an epoxy and a filler, said filler being amorphous silica, said filler having a concentration of at least 68 percent.

12. An optical device in which a plurality of optical elements are adhered to a support member, said optical device for acting on optical signals, said optical device comprising:
    a first collimator;
    a second collimator;
    an actuator;
    a housing defining two openings for receiving said first and second collimators, said housing defining an actuator opening for receiving said actuator, said actuator opening substantially between about said two openings, said first collimator positioned such that a light beam is directed into said second collimator through at least one mirror, said actuator positioned such that said actuator interacts with said light beam when said actuator is actuated, said housing having a pair of slots for each of said two openings and said actuator opening, said pair of slots diametrically opposed relative to each of said two openings and said actuator opening, each of said pair of slots having a longitudinal axis parallel to a corresponding longitudinal axis of said first and second collimators and said actuator; and
    an adhesive disposed within each of said pair of slots, said adhesive adhering to a corresponding said first and second collimator and to an inside surface of each of said pair of slots, said adhesive having a viscosity sufficiently high that said adhesive, in an uncured state, does not substantially wick between said first and second collimators and said housing and between said actuator and said housing.

13. The optical device of claim 12 wherein said adhesive is limited to a volume bounded by said pair of slots and a surface of said first member.

14. The optical device of claim 12 wherein said adhesive is an epoxy with a filler, said filler being amorphous silica.

15. The optical device of claim 12 wherein said adhesive includes a filler of amorphous silica having an average particle size less than or equal to 10 micrometers.

16. The optical device of claim 12 wherein said adhesive is an epoxy with a filler having a concentration of at least 68%, said filler being amorphous silica.

17. The optical device of claim 12 wherein said actuator includes an attenuator that interacts with an optical path from said first collimator to said second collimator.

18. The optical device of claim 12 further including:
    a third collimator;
    a third collimator opening for receiving said third collimator, said housing having a pair of third collimator slots for said third collimator opening, said pair of third collimator slots diametrically opposed relative to said third collimator opening, said pair of third collimator slots having a longitudinal axis parallel to a corresponding longitudinal axis of said third collimator; and said adhesive disposed within said pair of third collimator slots, said adhesive adhering to said third collimator and to an inside surface of said pair of third collimator slots, said adhesive having a viscosity sufficiently high that said adhesive, in an uncured state, does not substantially wick between said third collimator and said housing.

19. The optical device of claim 18 wherein said actuator includes a mirror which, when interjected into an optical path from said first collimator to said third collimator by said actuator, said optical path is redirected from said first collimator to said second collimator.

20. The optical device of claim 18 wherein said actuator includes a mirror which, when interjected into a first optical path from said first collimator to said third collimator by said actuator, said first optical path is interrupted and a second optical path is formed from said second collimator to said third collimator.

21. The optical device of claim 18 wherein said adhesive includes a filler having an average particle size less than or equal to 10 micrometers.

22. An optical device in which a first element is adhered to a second element, said optical device comprising:
an optical element;
a means for supporting said optical element; and
a means for adhering said optical element to said means for supporting.

23. The optical device of claim 22 wherein said means for adhering includes an adhesive in contact with said optical element and said means for supporting such that said adhesive bridges an area adjacent to where said optical element is proximal said means for supporting.

* * * * *